US012778088B2

(12) United States Patent
Tsukada et al.

(10) Patent No.: US 12,778,088 B2
(45) Date of Patent: Nov. 3, 2026

(54) METHOD FOR MEASURING EGGS

(71) Applicants: HYTEM CO., LTD., Kakamigahara (JP); NAGOYA DENKI EDUCATIONAL FOUNDATION, Nagoya (JP)

(72) Inventors: Toshihiko Tsukada, Toyota (JP); Yoshinori Imamura, Kakamigahara (JP)

(73) Assignees: NAGOYA DENKI EDUCATIONAL FOUNDATION, Nagoya (JP); HYTEM CO., LTD., Gifu (JP)

( * ) Notice: Subject to any disclaimer, the term of this patent is extended or adjusted under 35 U.S.C. 154(b) by 218 days.

(21) Appl. No.: 18/859,015

(22) PCT Filed: Apr. 22, 2022

(86) PCT No.: PCT/JP2022/018620
§ 371 (c)(1),
(2) Date: Oct. 22, 2024

(87) PCT Pub. No.: WO2023/203776
PCT Pub. Date: Oct. 26, 2023

(65) Prior Publication Data

US 2026/0182547 A1 Jul. 2, 2026

(51) Int. Cl.
*G06T 7/62* (2017.01)
*A01K 43/06* (2006.01)
*G01B 11/08* (2006.01)

(52) U.S. Cl.
CPC .............. *A01K 43/06* (2013.01); *G01B 11/08* (2013.01); *G06T 7/62* (2017.01); *G06T 2207/30128* (2013.01)

(58) Field of Classification Search
CPC .......... A01K 43/06; G01B 11/08; G06T 7/62; G06T 2207/30128
See application file for complete search history.

(56) References Cited

U.S. PATENT DOCUMENTS

2014/0307086 A1 10/2014 Ota et al.
2022/0174912 A1* 6/2022 Kashimori ........... A01K 43/005

FOREIGN PATENT DOCUMENTS

CN 102628683 A * 8/2012
JP 56-001108 1/1981

(Continued)

OTHER PUBLICATIONS

Bridge, E. S., Boughton, R. K., Aldredge, R. A., Harrison, T. J. E., Bowman, R., & Schoech, S. J. (2007). Measuring egg size using digital photography: Testing Hoyt's method using Florida Scrub-Jay eggs. Journal of Field Ornithology, 78(1), 109-116. https://doi.org/10.1111/j.1557-9263.2006.00092.x (Year: 2007).*

(Continued)

*Primary Examiner* — Gregory A Morse
*Assistant Examiner* — David Alexander Wambst
(74) *Attorney, Agent, or Firm* — Wenderoth, Lind & Ponack, L.L.P.

(57) ABSTRACT

When using a camera (25) to photograph, from directly above, an egg (10) of an unknown size conveyed by a conveyor and determining a real size from the size of an egg image, a reference surface (20) where the distance from the camera is a predetermined value H is set, a relationship between a real length of a maximum short-axis radius and a length in a captured image is preliminarily determined by placing multiple eggs of different sizes with known maximum short-axis radii (r) on the reference surface and photographing the eggs, and a relationship between a ratio, between the length in the captured image and the real length, and a height h from the reference surface is preliminarily determined.

4 Claims, 12 Drawing Sheets

(56) References Cited

FOREIGN PATENT DOCUMENTS

| | | |
|---|---|---|
| JP | 59-151007 | 8/1984 |
| JP | 2010-271044 | 12/2010 |
| JP | 2015-65959 | 4/2015 |
| JP | 2015-68803 | 4/2015 |
| TW | 201333417 | 8/2013 |

OTHER PUBLICATIONS

Soltani, M., Mahmoud Omid, & Reza Alimardani. (2014). Egg volume prediction using machine vision technique based on pappus theorem and artificial neural network. Journal of Food Science and Technology, 52(5), 3065-3071. https://doi.org/10.1007/s13197-014-1350-6 (Year: 2014).*

Ab Nasir, A. F., Sabarudin, S. S., Abdul Majeed, A. P. P., & Abdul Ghani, A. S. (2018). Automated egg grading system using computer vision: Investigation on weight measure versus shape parameters, 342, 012003. https://doi.org/10.1088/1757-899x/342/1/012003 (Year: 2018).*

Alikhanov, J., Penchev, S., Georgieva, T., Moldazhanov, A., Kulmakhambetova, A., Shynybay, Z., Stefanov, E., & Daskalov, P. (2019). Design and Performance of an Automatic Egg Sorting System Based on Computer Vision. TEM Journal, 8(4), 1319-1325. https://doi.org/10.18421/TEM84-31 (Year: 2019).*

Mizuno, N., & Nakano, Y. (2020, Jan. 12). Development of Visual Egg Inspection System for Poultry Farmer Using CNN with Deep Learning. https://ieeexplore.ieee.org/stamp/stamp.jsp?tp=&arnumber=9025861 (Year: 2020).*

International Search Report issued Jul. 19, 2022 in International Application No. PCT/JP2022/018620.

* cited by examiner

Fig. 11A

1st Table

| LD \ θ | 0° | · · | 30° | · · | 60° | · · | 90° |
|---|---|---|---|---|---|---|---|
| ⋮ | ⋮ | ⋮ | ⋮ | ⋮ | ⋮ | ⋮ | ⋮ |
| 60.0 | 58.8 | · · | 60.0 | · · | 60.0 | · · | 60.0 |
| ⋮ | ⋮ | ⋮ | ⋮ | ⋮ | ⋮ | ⋮ | ⋮ |
| 58.0 | 56.3 | · · | 57.4 | · · | 57.4 | · · | 57.4 |
| ⋮ | ⋮ | ⋮ | ⋮ | ⋮ | ⋮ | ⋮ | ⋮ |
| 56.0 | 53.8 | · · | 54.9 | · · | 54.9 | · · | 54.9 |
| ⋮ | ⋮ | ⋮ | ⋮ | ⋮ | ⋮ | ⋮ | ⋮ |
| 54.0 | 51.3 | · · | 52.4 | · · | 52.4 | · · | 52.4 |
| ⋮ | ⋮ | ⋮ | ⋮ | ⋮ | ⋮ | ⋮ | ⋮ |
| 52.0 | 48.9 | · · | 49.9 | · · | 49.9 | · · | 49.9 |
| ⋮ | ⋮ | ⋮ | ⋮ | ⋮ | ⋮ | ⋮ | ⋮ |

Fig. 11B

2nd table

| LD \ θ | 0° | · · | 30° | · · | 60° | · · | 90° |
|---|---|---|---|---|---|---|---|
| ⋮ | ⋮ | ⋮ | ⋮ | ⋮ | ⋮ | ⋮ | ⋮ |
| 60.0 | 0.98 | · · | 1.0 | · · | 1.0 | · · | 1.0 |
| ⋮ | ⋮ | ⋮ | ⋮ | ⋮ | ⋮ | ⋮ | ⋮ |
| 58.0 | 1.0 | · · | 0.99 | · · | 0.99 | · · | 0.99 |
| ⋮ | ⋮ | ⋮ | ⋮ | ⋮ | ⋮ | ⋮ | ⋮ |
| 56.0 | 1.0 | · · | 0.98 | · · | 0.98 | · · | 0.98 |
| ⋮ | ⋮ | ⋮ | ⋮ | ⋮ | ⋮ | ⋮ | ⋮ |
| 54.0 | 1.0 | · · | 0.97 | · · | 0.97 | · · | 0.98 |
| ⋮ | ⋮ | ⋮ | ⋮ | ⋮ | ⋮ | ⋮ | ⋮ |
| 52.0 | 0.9 | · · | 0.96 | · · | 0.96 | · · | 0.96 |
| ⋮ | ⋮ | ⋮ | ⋮ | ⋮ | ⋮ | ⋮ | ⋮ |

METHOD FOR MEASURING EGGS

BACKGROUND OF THE INVENTION

Field of the Invention

The present invention relates to egg measuring methods for measuring the sizes of eggs.

Description of the Related Art

The mass of eggs produced in a facility where fowls are raised serves as information for determining whether the raising environment or the feeding condition is appropriate for the fowls or for determining whether the health condition of the fowls are good, and can thus serve as useful information for managing the fowls being raised.

On the other hand, in a grading-and-packing center (referred to as "GP center" hereinafter), the mass is measured for all eggs shipped from a poultry facility, the eggs are grouped as indicated below in accordance with the mass, and the eggs are packaged and boxed for each group.

LL: 70 g or more and less than 76 g
L: 64 g or more and less than 70 g
M: 58 g or more and less than 64 g
MS: 52 g or more and less than 58 g
S: 46 g or more and less than 52 g
SS: 40 g or more and less than 46 g In a large-scale poultry facility, fowls of the same age (fowls born on the same day) are normally raised in a single poultry house. Although there are individual differences to some extent, fowls of the same age mostly lay eggs having about the same mass. Therefore, if the egg mass measurement is performed in every poultry house in the GP center, since most of the eggs have about the same mass, the eggs would concentrate in lanes for packaging eggs of certain sizes, whereas lanes for packaging eggs of other sizes would be empty, thus resulting in poor processing efficiency.

In order to efficiently perform the process in the GP center, it is desirable that eggs to be processed are collected such that there is a uniform mixture of various sizes. Therefore, the process in the GP center is normally performed in a state where there is a mixture of eggs produced in multiple poultry houses. In this case, however, the mass of each egg measured in the GP center does not serve as useful information for managing the fowls in the poultry facility.

Even if an egg whose mass is measured in the GP center can be associated with the poultry facility serving as the shipping source, it takes a certain number of days for the mass measurement result to be fed back to the poultry facility after the egg is laid. In the poultry facility, there is a demand to ascertain a short-term cause-and-effect relationship between the mass of the egg and the fowl raising/management conditions, such as whether the mass of the egg produced on that day is affected by the feeding condition on the previous day.

Due to these reasons, it is desirable in the poultry facility that the mass of the eggs produced in the facility is measured separately from the measurement in the GP center. Because an enormous number of eggs are produced each day in a large-scale poultry facility, it is desirable that the measurement is performed in an automated process without requiring manpower.

The present applicant has conceived of performing size measurement as automated measurement on an egg being conveyed by a conveyor. It is conceivable that the mass can be estimated so long as the size can be accurately measured.

SUMMARY OF THE INVENTION

In view of the circumstances described above, an object of the present invention is to provide an egg measuring method that enables accurate size measurement of an egg conveyed by a conveyor.

In order to solve the aforementioned problems, an egg measuring method according to the present invention involves using a camera to photograph, from directly above, an egg of an unknown size conveyed by a conveyor, measuring a size of an egg image extracted from a captured image, and determining a real size of the egg. The egg measuring method includes: defining a rotation center axis as a long axis when a three-dimensional shape of the egg is regarded as a rotating body, and defining a radius with a maximum length as a maximum short-axis radius among radii of an infinite number of cross-sectional circles orthogonal to the long axis; setting a reference surface where a distance from the camera is a predetermined value; preliminarily determining a first relational expression and preliminarily determining a second relational expression from the first relational expression, the first relational expression being determined by placing multiple eggs of different sizes with known maximum short-axis radii or spheres with known radii on the reference surface and photographing the eggs or the spheres, the first relational expression being a relationship between a real length of a maximum short-axis radius and a maximum short-axis radius in the captured image, the second relational expression indicating a change in a ratio between a length in the captured image and the real length in accordance with a height from the reference surface; and converting the size of the egg image into the real size based on the first relational expression and the second relational expression.

The extraction of the egg image from the captured image and the measurement of the size of the egg in the captured image can be performed in accordance with an image analysis.

When the size of the egg is different, the distance from the camera, which photographs the egg from directly above, to the egg changes. For example, a large egg is photographed as being larger. In other words, although the objective is to determine the real size of the egg from the egg image in the captured image, if the real size of the egg is different, there is a problem in that the relationship between the size of the egg image and the real size changes.

In the present invention, the relational expressions are preliminarily determined by placing multiple eggs of different sizes with known maximum short-axis radii or spheres with known radii on the reference surface and photographing the eggs or the spheres. The reason for focusing on the maximum short-axis radius is that, when an egg placed on the reference surface is photographed from directly above, the contour of the egg at a height where the height from the reference surface is equal to the maximum short-axis radius is the contour of the egg in the captured image. This is a unique relationship when photographing an egg placed somewhere becomes stable in an orientation where the long axis is aligned with the horizontal direction. The reason that a sphere with a known radius can be used in place of an egg with a known size is that, when the rotation center axis in a case where the three-dimensional shape of the egg is regarded as a rotating body is defined as a long axis, the cross section orthogonal to the long axis is circular. The radius of the sphere can be regarded as the maximum short-axis radius of an egg with a known size.

As the relational expressions, the first relational expression as a relationship between the real length of the maximum short-axis radius and the maximum short-axis radius in the captured image is determined, and the second relational expression indicating a change in the ratio between the length in the captured image and the real length in accordance with the height from the reference surface is further determined from the first relational expression. When determining these relational expressions, only the maximum short-axis radius needs to be measured for each of the actual egg and the egg image, thereby simplifying the process for determining the relational expressions.

According to the present invention, the problem where the distance from the camera varies depending on the size of the egg, as will be described in detail later, is solved by using the first relational expression and the second relational expression, and the size of the captured egg image can be converted into the real length of the egg.

In addition to the above configuration, in the egg measuring method according to the present invention, the conveyor may be a conveyor in which the reference surface serves as a conveyance surface. When a contour of the egg image is a contour at a height h from the reference surface with respect to the egg placed on the reference surface, a relationship in which the height h is the real length of the maximum short-axis radius may be used to convert the size in the captured image into the real length by using the real length of the maximum short-axis radius determined from the first relational expression as the height from the reference surface in the second relational expression.

In this configuration, an egg of an unknown size conveyed on the conveyor can be regarded as an egg placed on the reference surface. Therefore, a length other than the maximum short-axis radius in the captured image can be converted into the real length by using the real length of the maximum short-axis radius, determined from the maximum short-axis radius in the image by using the first relational expression, as the height from the reference surface in the second relational expression.

As an alternative to the above configuration, in the egg measuring method according to the present invention, the conveyor may be a bar conveyor that conveys the egg while retaining the egg between bars. When a contour of the egg image is a contour at a height h from the reference surface with respect to the egg retained between the bars, a distance between the bars is defined as 2d, the real length of the maximum short-axis radius is defined as r, and the reference surface is aligned with an imaginary plane connecting upper end lines of the bars to each other, a third relational expression may be determined from the second relational expression by using a relationship in which $h=(r^2-d^2)^{1/2}$, the third relational expression indicating a relationship between the size of the egg image and the real size. The real size of the egg whose long axis is aligned with an axial direction of the bars may be determined from the third relational expression.

This configuration corresponds to an egg measuring method in a case where the conveyor that conveys an egg is a bar conveyor. When being conveyed by the bar conveyor, the egg is in an orientation where the lower portion thereof is fitted between the bars. Because the fit depth between the bars varies depending on the size of the egg or the angle that the long axis of the egg has with the axial direction of the bars, there is a problem in that the aforementioned second relational expression cannot be used directly.

This configuration focuses on the fact that the relationship of $h=(r^2-d^2)^{1/2}$ (2d: bar pitch, r: real length of maximum short-axis radius) can be regarded as being established when the long axis of the egg is aligned with the axial direction of the bars. By defining the height h in the second relational expression as $(r^2-d^2)^{1/2}$, the size in the captured image can be converted into the real size.

Normally, eggs conveyed on a bar conveyor are in various orientations. At least a portion of a conveyance path of the bar conveyor causes the bars to rotate around the axes thereof, thereby aligning the orientation of the eggs such that the long axis of each egg is aligned with the axial direction of the bars. This is because, as the egg rotates with the rotation of the bars, the egg changes to an orientation that causes the egg to be fitted deeply between adjacent bars and to become stable. Therefore, the bars are caused to rotate around the axes thereof in at least a portion of the conveyance path of the bar conveyor located upstream of the photographing location by the camera, so that the eggs can be photographed after being aligned in orientation, whereby the present invention can be applied to substantially all of the eggs being conveyed.

Next, an egg measuring method according to the present invention involves using a camera to photograph, from directly above, an egg of an unknown size conveyed by a conveyor, measuring a size of an egg image extracted from a captured image, and determining a real size of the egg. The conveyor is a bar conveyor that conveys the egg while retaining the egg between bars. The egg measuring method includes: defining a rotation center axis as a long axis when a three-dimensional shape of the egg is regarded as a rotating body; preliminarily creating a table by retaining multiple eggs or egg-shaped alternatives with known sizes and different sizes between bars and photographing the eggs or the egg-shaped alternatives while long axes thereof have different angles with an axial direction of the bars, the table having sizes in captured images being associated with real sizes and the angles; and determining the real size of the egg from the table by measuring the size of the egg image and the angle that the long axis has with the axial direction of the bars in the captured image.

This configuration corresponds to an egg measuring method in a case where the conveyor that conveys eggs is a bar conveyor and the eggs are in various orientations. As mentioned above, the fit depth between the bars varies depending on the orientation of each egg in addition to the size of the egg. As the angle that the long axis of the egg has with the axial direction of the bars approaches the right angle, the fit depth decreases, and the degree of decrease thereof increases with increasing size of the egg. On the other hand, as the angle that the long axis of the egg has with the axial direction of the bars decreases, the fit depth increases, and the degree of increase thereof increases with decreasing size of the egg.

In this method, the table is preliminarily created by retaining multiple eggs with known sizes and different sizes in various orientations between the bars. In the table, the sizes in the captured images are associated with the real sizes and the angles. The sizes to be focused on when creating the table may be the maximum short-axis radii or the long-axis diameters, to be described later, or tables for both may be created. Because the ratio between the size in the captured image and the real size can be ascertained from the table, if the real length of the size focused on when creating the table can be ascertained, another size in the captured image can be converted into a real size by using this ratio. Alternatives, such as egg-shaped models, may be used in place of the multiple eggs with known sizes and different sizes.

Accordingly, the present invention can provide an egg measuring method that enables accurate size measurement of an egg conveyed by a conveyor.

BRIEF DESCRIPTION OF THE DRAWINGS

FIG. 11A illustrates a first table, and FIG. 11B illustrates a second table.

DESCRIPTION OF THE EMBODIMENTS

A specific embodiment of the present invention will be described below by using the drawings. An egg measuring method according to this embodiment involves using a camera 25 to photograph, from above, an egg 10 conveyed by a conveyor and determining the real size of the egg 10 based on a captured image 30.

Figure 1A:
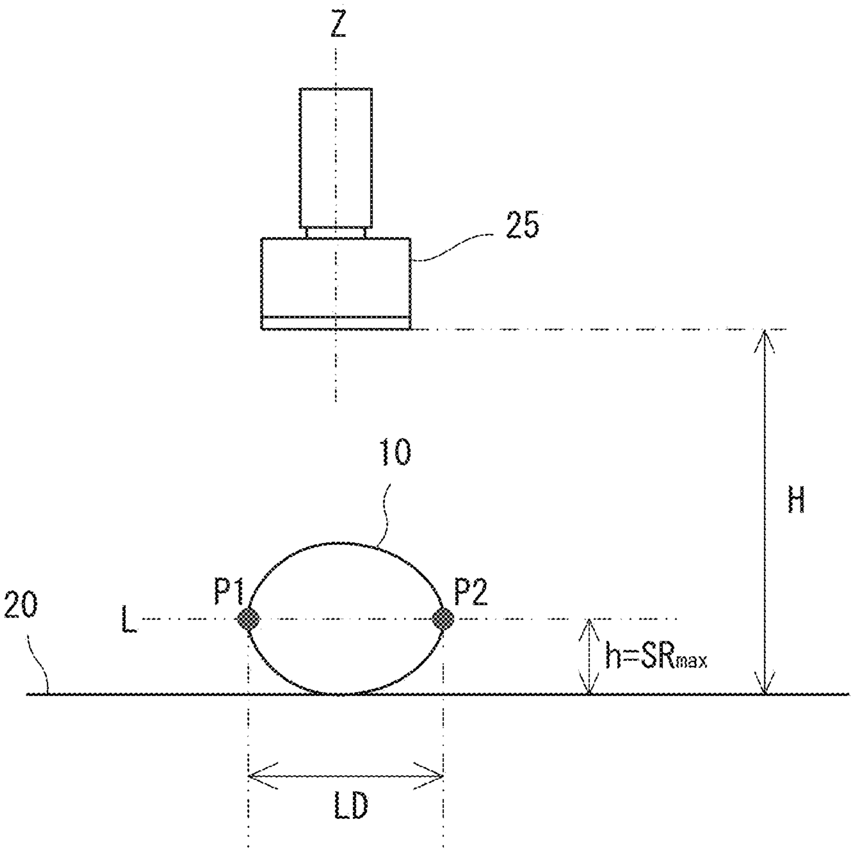
FIG. 1A illustrates how an egg placed on a reference surface is photographed.
Figure 1B:
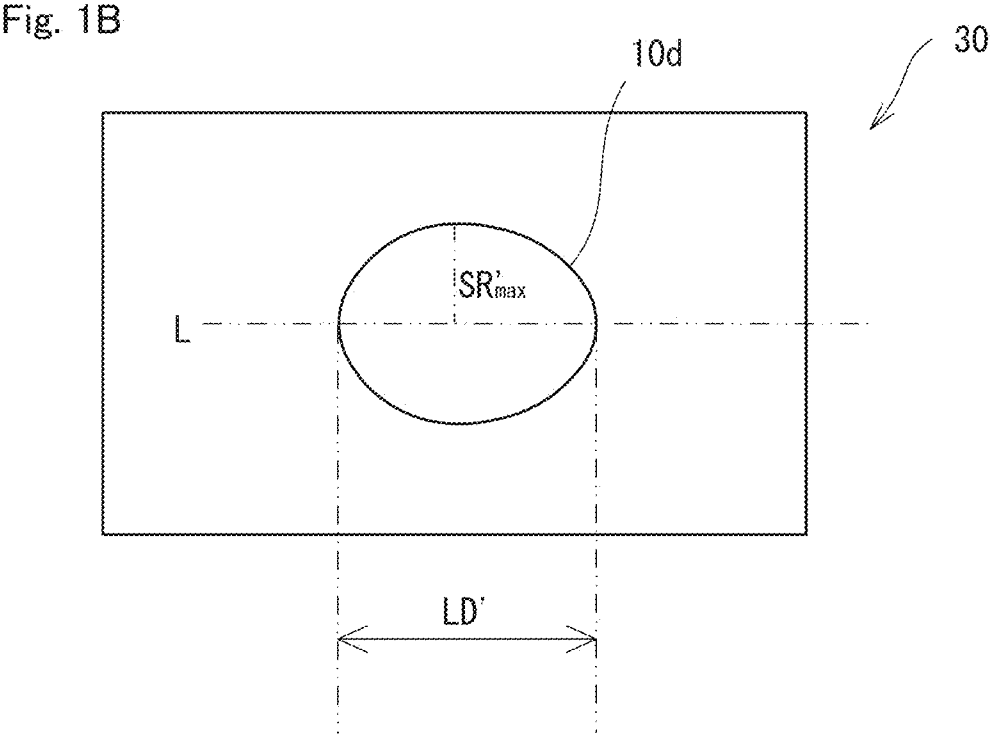
FIG. 1B illustrates a captured image.
Figure 12:
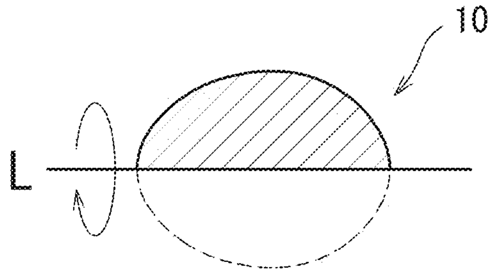
FIG. 12 illustrates a case where the three-dimensional shape of the egg is regarded as a rotating body.

First, as shown in FIG. 1A, the following is a conceivable case where the egg 10 placed on a reference surface 20 located at a distance of H from the camera 25 is photographed directly from above by the camera 25 having an optical axis Z extending in the vertical direction, and the captured image 30 (still image) including an egg image 10*d* is obtained, as in FIG. 1B. As shown in FIG. 12, the three-dimensional shape of the egg 10 is regarded as a rotating body having a rotation center axis referred to as "long axis L". Among lines each connecting two points on a contour in a cross section of the egg 10 taken along a plane including the long axis L, the length of a line connecting two points P1 and P2 between which the length reaches a maximum will be referred to as "long-axis diameter LD". The radii of an infinite number of cross-sectional circles orthogonal to the long axis L will each be referred to as "short-axis radius SRn", and the radius with the maximum length among the short-axis radii SRn will be referred to as "maximum short-axis radius $SR_{max}$".

The contour of the egg image 10*d* captured from directly above by the camera 25 can be regarded as the contour at the height where the external shape of the egg 10 when cut along a horizontal plane is at the maximum, and will be referred to as "maximum contour". Assuming that the height from the reference surface 20 to the maximum contour of an actual egg 10 is defined as h, the height h is the maximum short-axis radius $SR_{max}$. This is a unique relationship when the egg 10 in the most stable orientation where the long axis L extends in the horizontal direction is to be photographed.

$$h = SR_{max}$$

In order to distinguish the long-axis diameter, the short-axis radius, and the maximum short-axis radius in the egg image 10*d* extracted from the captured image 30 from those of the actual egg 10, the long-axis diameter, the short-axis radius, and the maximum short-axis radius in the egg image 10*d* will respectively be referred to as follows:

long-axis diameter LD' short-axis radius SR'n maximum short-axis radius $SR'_{max}$

Figure 2:
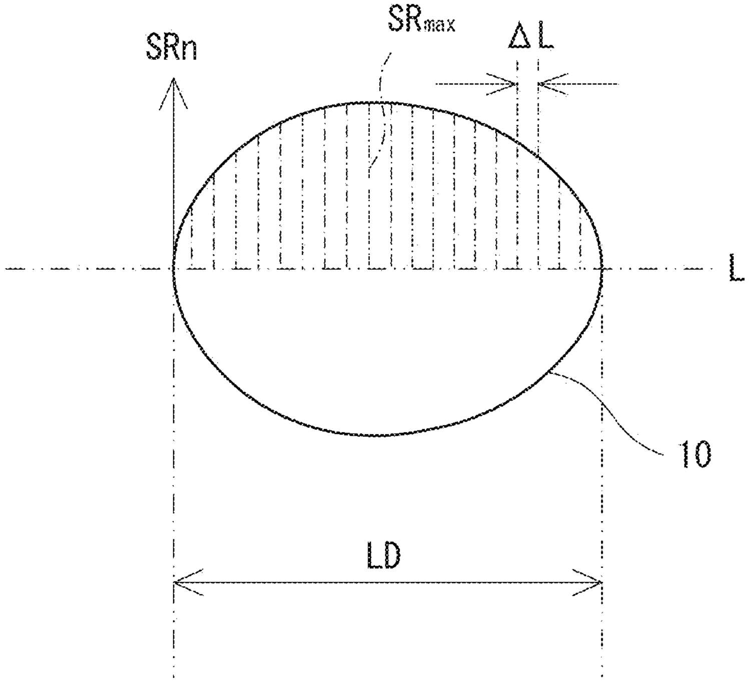
FIG. 2 schematically illustrates a method for determining a volume of the egg.

By measuring the long-axis diameter LD', the short-axis radii SR'n, and the maximum short-axis radius $SR'_{max}$ in the egg image 10*d* and converting them into the long-axis diameter LD, the short-axis radius SRn, and the maximum short-axis radius $SR_{max}$ each serving as the real length, the volume of the egg 10 can be calculated. For example, as shown in FIG. 2, by splitting the egg 10 at a fixed pitch ΔL in the direction of the long axis L and approximating the three-dimensional shape of the egg 10 into disk-shaped layered bodies each having a thickness ΔL and a radius SRn (indicated with a single-dot chain line), the volume of the egg 10 can be calculated. Alternatively, by determining a numerical expression expressing the short-axis radius SRn and integrating the areas of circles, each having a radius of SRn, by the length of the long-axis diameter LD in the direction of the long axis L, the volume of the egg 10 can be calculated.

Since the density of each egg 10 is substantially constant and is hardly affected by size differences among the eggs 10, the density is measured in advance for a sufficient number of eggs, and an average value thereof is determined. By multiplying the volume of the egg 10 by the density, the mass of the egg 10 can be estimated.

In order words, if the size of the egg image 10*d* can be converted into the real size of the egg 10, the volume and the mass of the egg 10 can be calculated.

Figure 3:
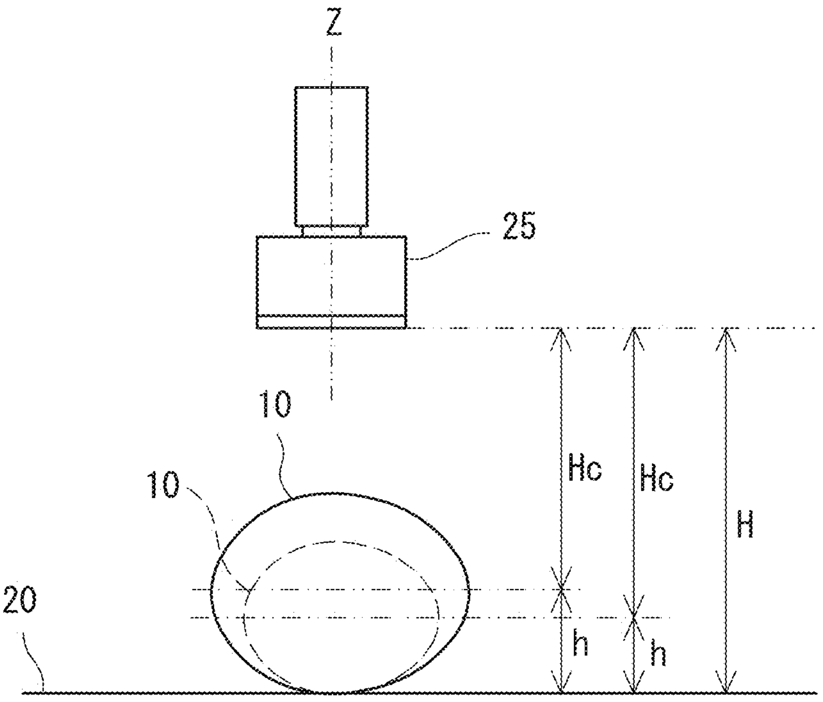
FIG. 3 illustrates that a distance from a camera changes depending on the size of the egg.

However, as schematically shown in FIG. 3, when eggs 10 have different sizes, there is a problem since the height h from the reference surface 20 to the maximum contour varies. In other words, a distance Hc from the camera 25 to the maximum contour varies depending on the size of the egg 10. For example, a large egg is photographed as being larger. Therefore, the relationship between the length in the egg image 10*d* and the real length of the egg 10 varies depending on the size of the egg 10.

Thus, the relationship between the length in the egg image 10*d* and the real length is preliminarily checked to see how the relationship changes relative to the height h from the reference surface. In order to achieve this, for example, multiple eggs 10 of different sizes and having known maximum short-axis radii $SR_{max}$ are each placed on the reference surface 20 and are photographed under the same photographing conditions. The reason for focusing on the maximum short-axis radius is due to the characteristic relationship of eggs in which the height h from the reference surface 20 to the maximum contour is equal to the maximum short-axis radius $SR_{max}$, as mentioned above.

Figure 4A:
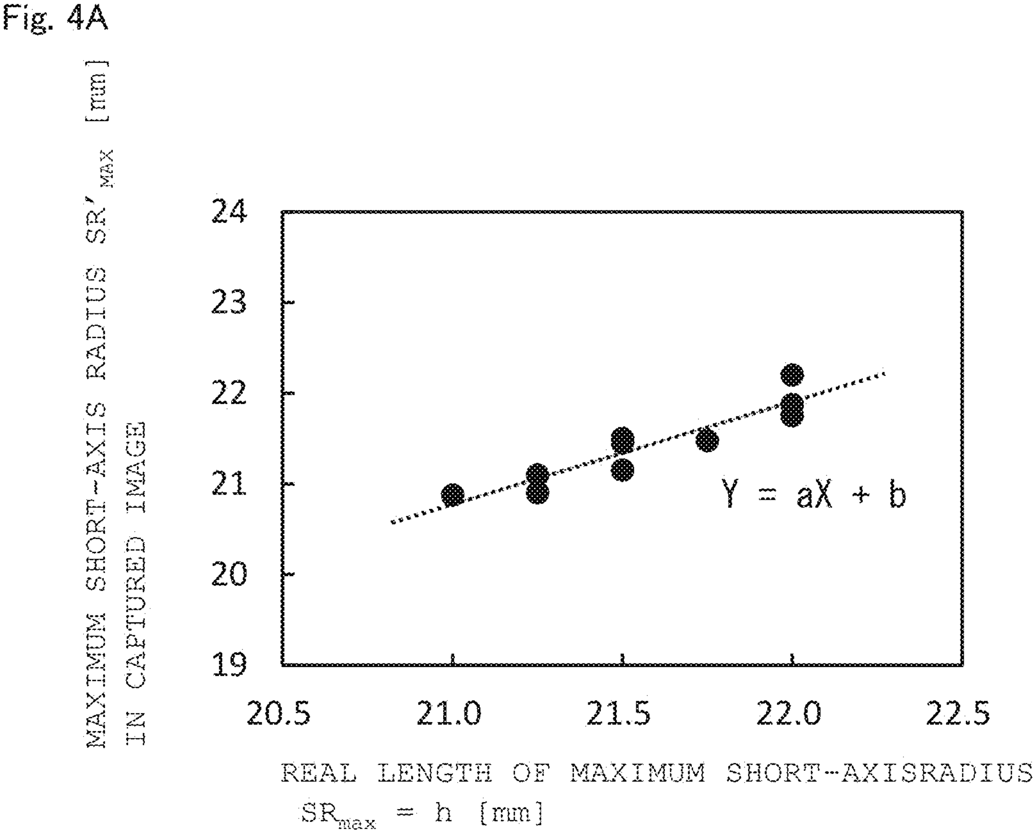
FIG. 4A is a graph indicating an example of a first relational expression.
Figure 4B:
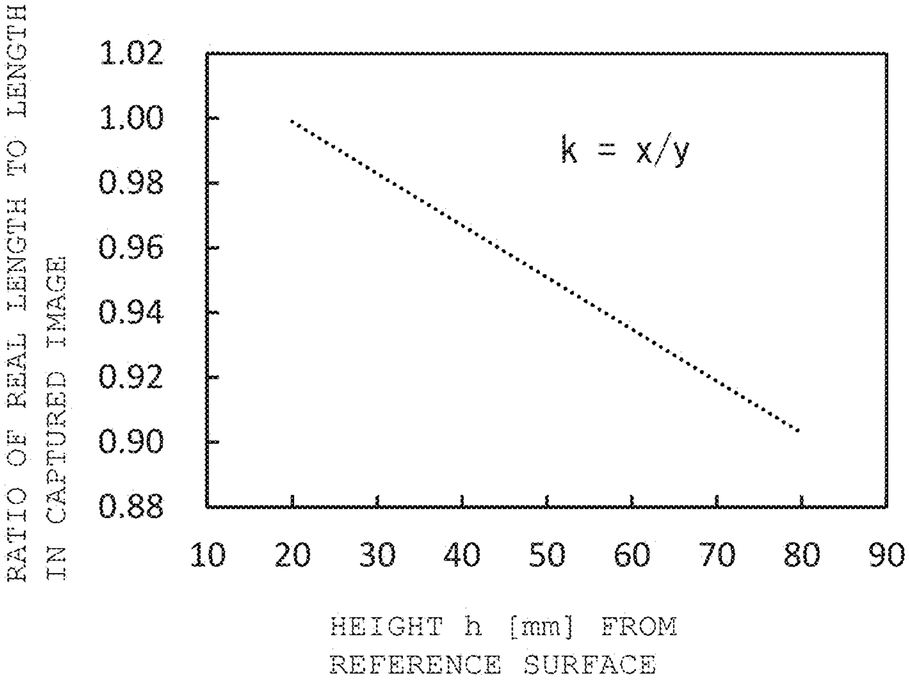
FIG. 4B is a graph indicating an example of a second relational expression.

Accordingly, a first-order relational expression shown in FIG. 4A is obtained. This will be defined as a first relational expression. Assuming that this first-order expression is defined as y=ax+b, "x" is the "maximum short-axis radius $SR_{max}$ serving as the real length" and is also the "height h". From the first relational expression, a "coefficient k=x/y" is determined. The coefficient k is a ratio between the length in the captured image 30 and the real length. As shown in FIG. 4B, the relationship between the coefficient k and the height h is also a first-order expression. This will be defined as a second relational expression.

An egg 10 of an unknown size may be photographed under the same photographing conditions as those when the above relational expressions are determined, so that, by using the above relational expressions, the real size of the egg 10 can be ascertained from the size in the egg image 10*d*. For example, when the maximum short-axis radius $SR'_{max}$ in the egg image 10*d* is a certain length, the maximum short-axis radius $SR_{max}$ serving as the real length can be determined from the first relational expression in FIG. 4A, and the height h that is the same value as the maximum short-axis radius $SR_{max}$ can be determined. The coefficient k corresponding to the height h can be determined from the second relational expression in FIG. 4B. Therefore, by multiplying each of the long-axis diameter LD' and the short-axis radius SR' in the egg image 10*d* by the coefficient k, the long-axis diameter LD' and the short-axis radius SR' can be converted into the long-axis diameter LD and the short-axis radius SRn each serving as the real length.

Figure 5:
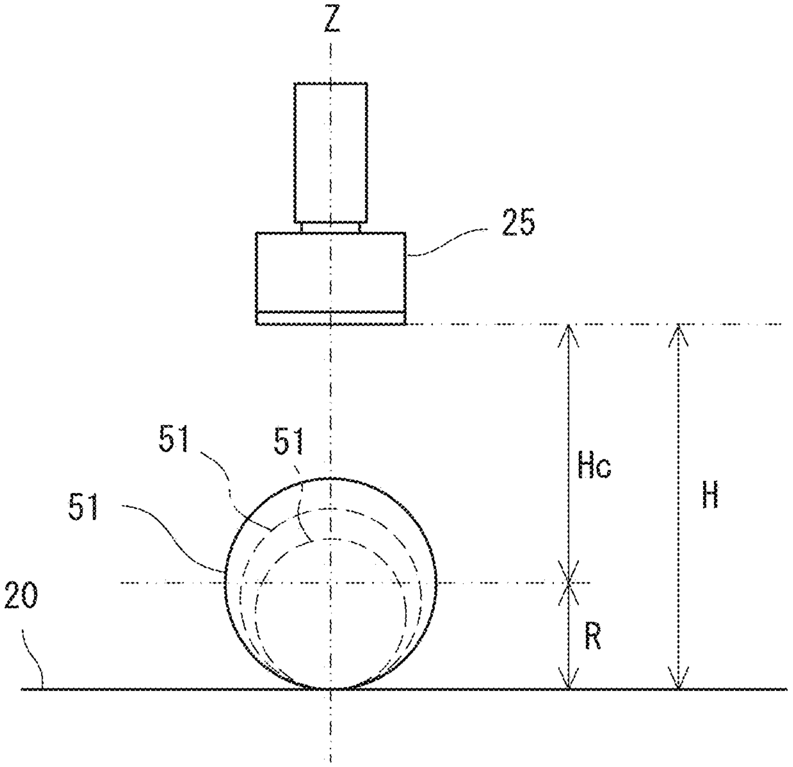
FIG. 5 illustrates a method for determining the first relational expression.

The above description relates to an example where, in order to determine the relational expressions shown in FIGS. 4A and 4B, multiple eggs of different sizes and having known maximum short-axis radii $SR_{max}$ are photographed while being placed on the reference surface 20. Alternatively, as shown in FIG. 5, spheres 51 having known radii R and various radii R may be used. By placing these spheres 51 on the reference surface 20 and photographing the spheres 51 under the same photographing conditions, a relational expression identical to the above first relational expression can be determined from the radius of each sphere in the captured image 30. The reason that the spheres 51 with the known radii can be used in place of the eggs with the known sizes is that the maximum short-axis radius $SR_{max}$ is focused on for determining the relational expressions. The radius R of each sphere can be regarded as the maximum short-axis radius $SR_{max}$ of an egg with a known size.

Conveyor has Flat Conveyance Surface (First Embodiment)

The following is a conceivable case where the conveyance surface is a flat surface, as in a case where the conveyor on which each egg 10 is conveyed is a belt conveyor. When the egg 10 conveyed on the conveyor is photographed from directly above, the reference surface 20 is aligned with the conveyance surface. Therefore, the size of the egg image 10*d* can be converted into the real size of the egg 10 in accordance with the above-described procedure, and the volume of the egg 10 can also be calculated, whereby the mass thereof can be estimated.

Conveyor is Bar Conveyor (Second Embodiment)

Because the eggs 10 have a shape that tends to cause them to roll easily, a bar conveyor is often used for conveying the eggs 10. A bar conveyor is a conveyor in which a large number of bars 40 whose opposite ends are supported by a pair of endless chains are arranged at a fixed pitch. Since each egg 10 is conveyed while the lower portion thereof is fitted between one bar 40 and another bar 40, the egg 10 is conveyed in a stable orientation without rolling.

Figure 6A:
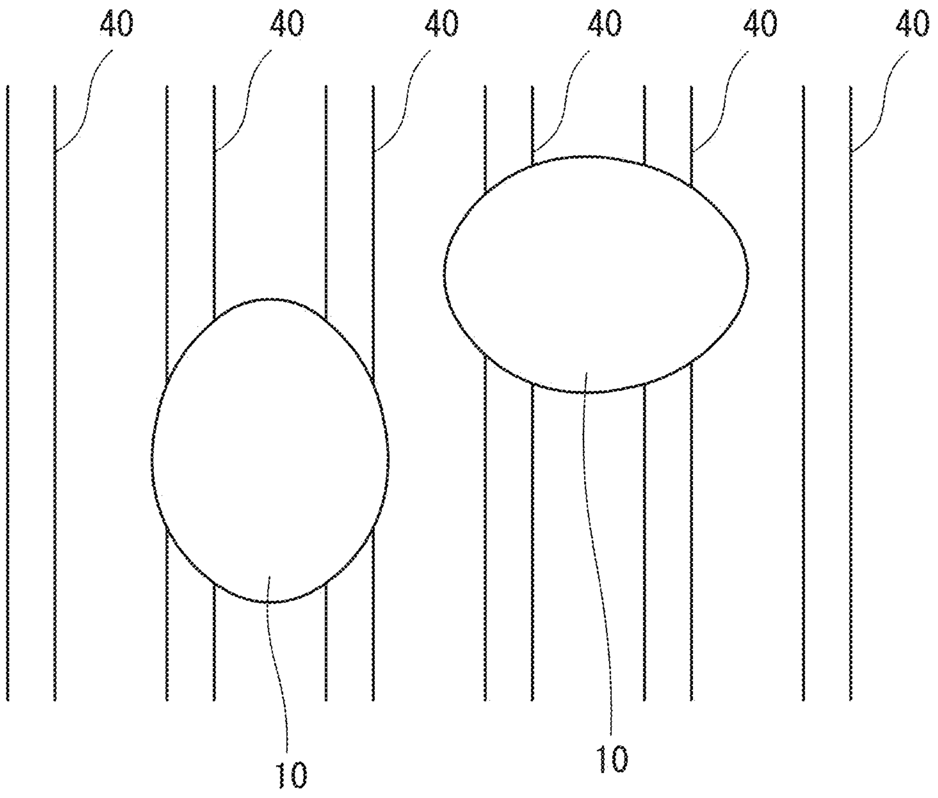
FIGS. 6A and 6B illustrate eggs conveyed by a bar conveyor.
Figure 6B:
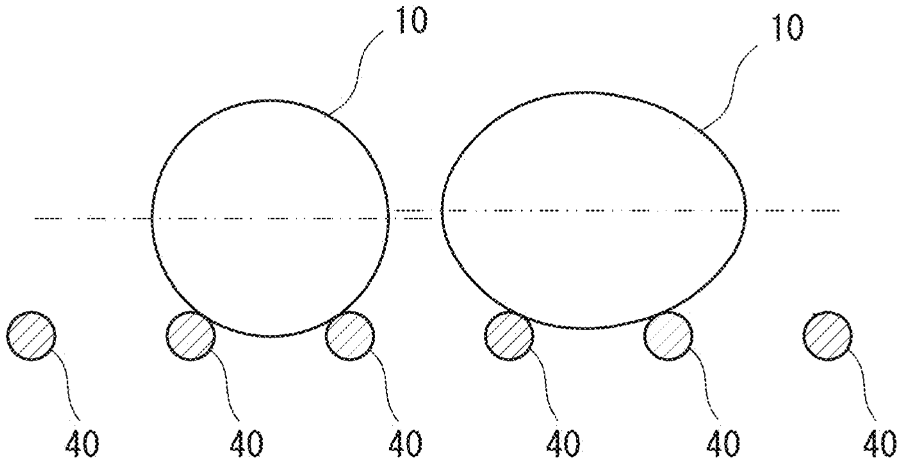
Figure 7A:
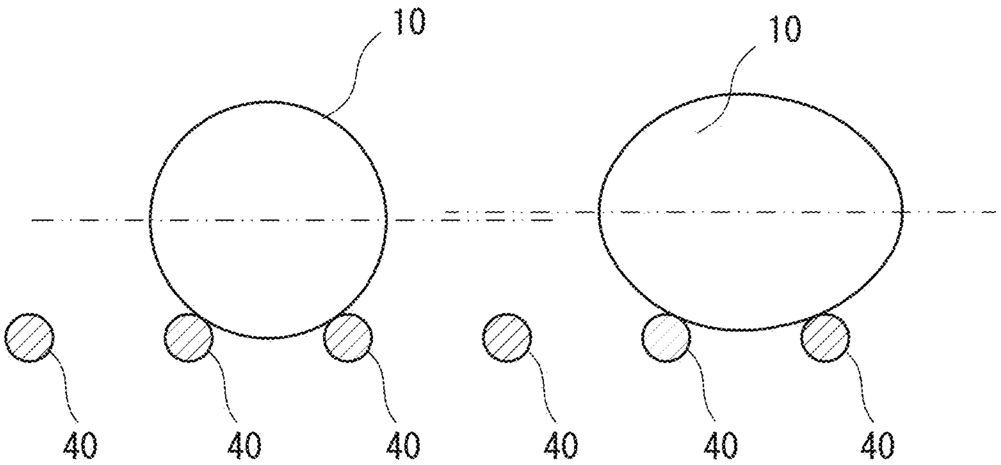
FIGS. 7A to 7C illustrate that a fit depth between bars varies depending on the size of the egg.
Figure 7B:
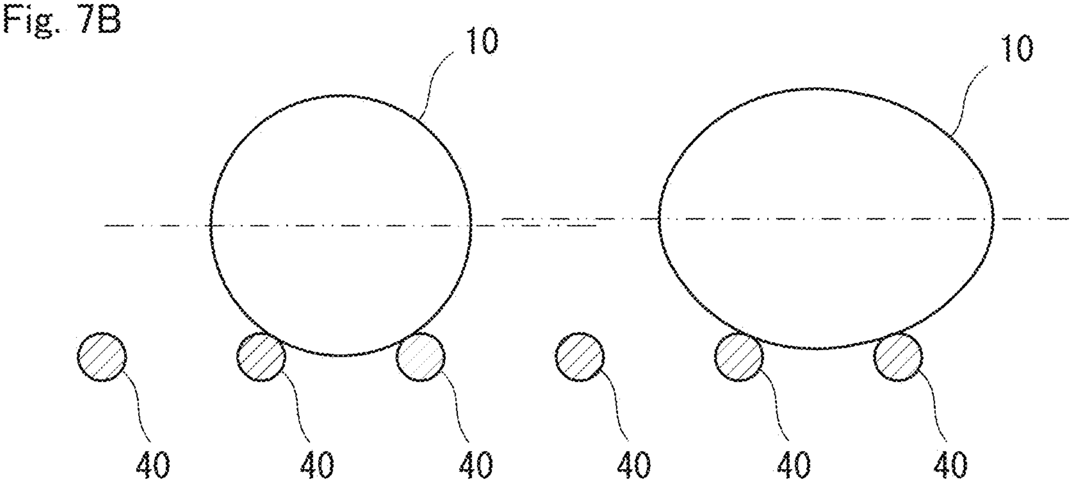
Figure 7C:
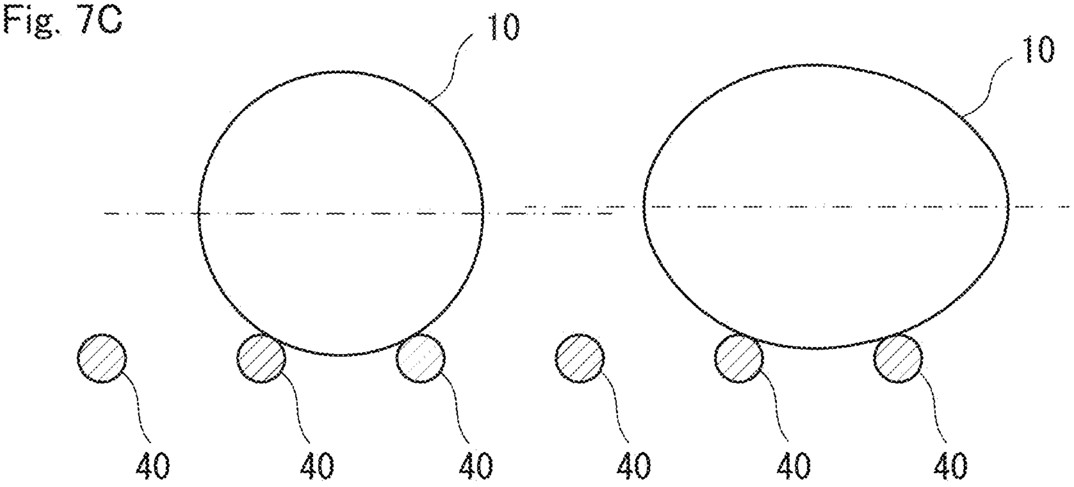

When the lower portion of the egg 10 is fitted between the bars 40, the distance Hc from the camera 25 to the maximum contour increases by the fit depth, as compared with a case where the egg is placed on the reference surface 20. The fit depth by which the lower portion of the egg 10 is fitted between the bars 40 also varies depending on the orientation of the egg relative to the bars 40, as shown in FIGS. 6A and 6B, and also varies depending on the size of the egg 10, as shown in FIGS. 7A to 7C. Therefore, when the real size of the egg 10 is to be determined from the captured image 30 obtained by photographing, from directly above, the egg 10 conveyed by the bar conveyor, the first relational expression and the second relational expression described above by using FIGS. 4A and 4B cannot be used directly.

Figure 8A:
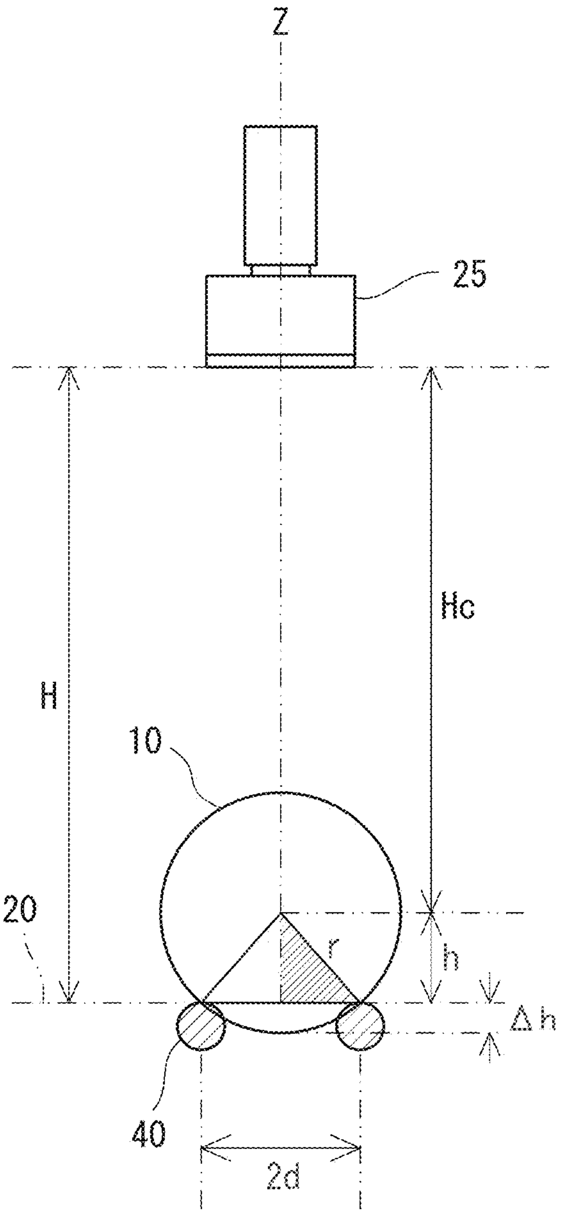
FIGS. 8A and 8B illustrate a method for determining a height h of the egg retained between the bars from the reference surface.
Figure 8B:
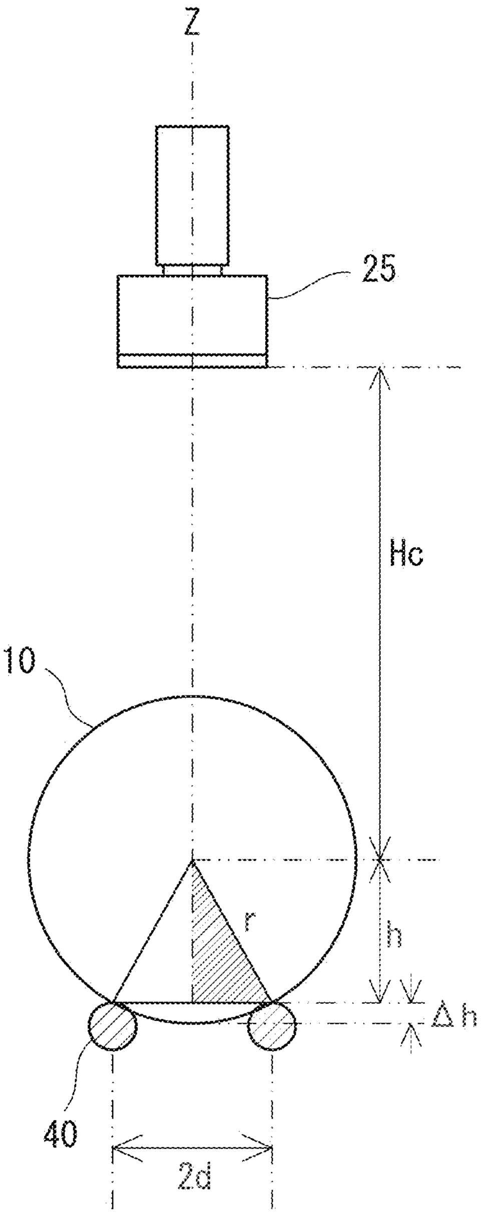

As shown in FIGS. 8A and 8B, when the long axis L of the egg 10 is aligned with the axial direction of the bars 40, the egg 10 retained between the bars 40 is circular with the maximum short-axis radius $SR_{max}$ as a radius r, as viewed from the axial direction of the bars 40. FIG. 8B illustrates a case where the egg 10 retained between the bars 40 is larger than that in FIG. 8A. It is apparent from these drawings that a fit depth Δh of the egg 10 between the bars 40 increases as the size of the egg 10 decreases. Assuming that the reference surface 20 where the distance from the camera 25 is H is an imaginary flat plane connecting upper end lines of the bars 40 and that the distance between the bars 40 is defined as 2d, it can be approximated that the following relationship is established between the height h from the reference surface 20 to the maximum contour and the radius r in accordance with the Pythagorean theorem:

$$r^2=h^2=d^2$$

whereby $h=(r^2-d^2)^{1/2}$

Figure 9A:
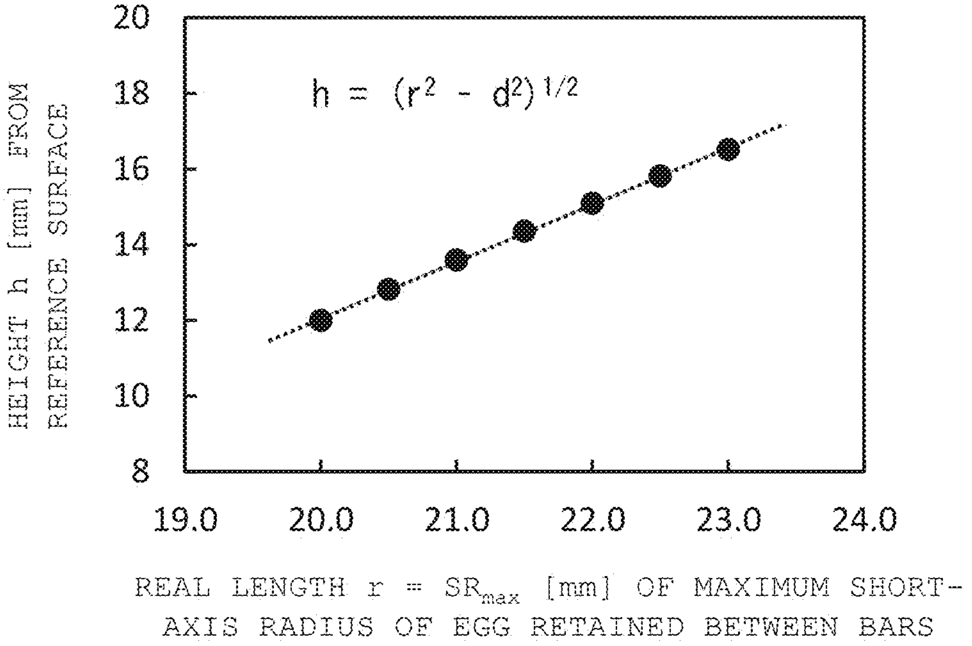
FIG. 9A is a graph indicating the relationship between a maximum short-axis radius (real length) of the egg retained between the bars and the height h from the reference surface.
Figure 9B:
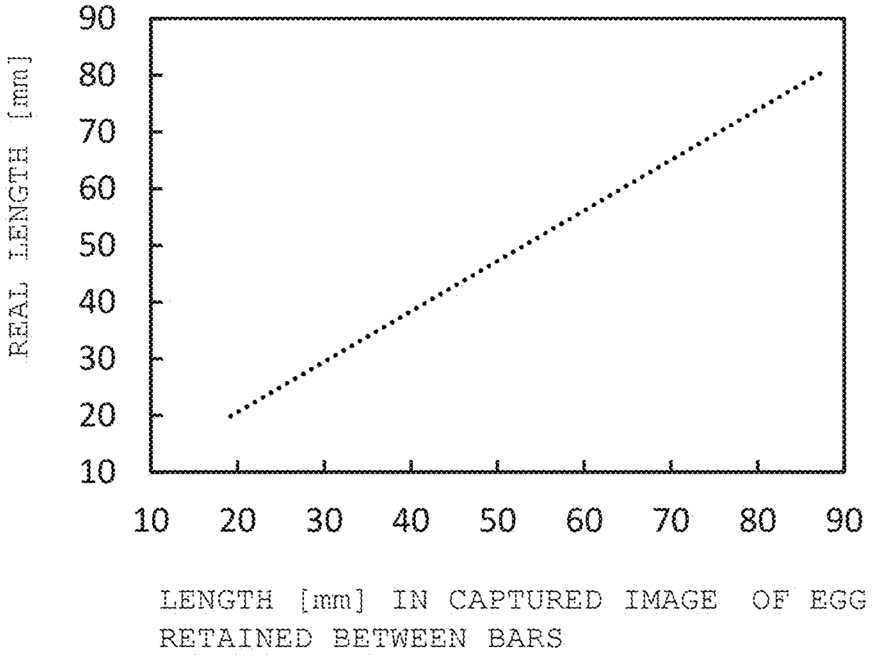
FIG. 9B is a graph indicating an example of a third relational expression.

By substituting various values as the radius r (equal to the maximum short-axis radius $SR_{max}$) into this expression and, for example, 32 mm as the distance between the bars 40 into this expression, a graph shown in FIG. 9A is obtained. By substituting the value of $h=(r^2-d^2)^{1/2}$ as the height h into the second relational expression in FIG. 4B, a first-order expression indicating the relationship between the length in the captured image 30 of the egg 10 retained between the bars 40 and the real length is obtained, as shown in FIG. 9B. This will be defined as a third relational expression. Therefore, by measuring the long-axis diameter LD', the short-axis radius SR'n, and the maximum short-axis radius $SR'_{max}$ in the captured egg image 10*d*, the long-axis diameter LD', the short-axis radius SR'n, and the maximum short-axis radius $SR'_{max}$ can be converted into the long-axis diameter LD, the short-axis radius SRn, and the maximum short-axis radius $SR_{max}$, each serving as the real length, in accordance with the third relational expression, so that the volume of the egg 10 can be calculated, whereby the mass thereof can be estimated.

When eggs are conveyed by a bar conveyor, the eggs are normally in various orientations. A normal bar conveyor conveys an item without rotation of the bars around the axes. In contrast, in this embodiment, at least a portion of a conveyance path of the bar conveyor causes the bars to rotate around the axes thereof, thereby aligning the orientation of the eggs such that the long axis L of each egg is aligned with the axial direction of the bars. An egg retained between rotating bars rotates as the bars rotate. While rotating in this manner, an egg conveyed in an orientation where the long axis L is not aligned with the axial direction of the bars also changes into an orientation where the long axis L is aligned with the axial direction of the bars. This is because this orientation causes the egg to be fitted deeply between adjacent bars to thus become more stable.

Therefore, in at least a portion of the conveyance path of the bar conveyor located upstream of the photographing location by the camera, the bars are caused to rotate around the axes thereof to align the orientation of the eggs such that the long axis L of each egg is aligned with the axial direction of the bars, whereby the real size of the egg can be determined by using the third relational expression described above using FIGS. 9A and 9B. The method for rotating the bars around the axes thereof involves, for example, making the bars rotatable and installing a plate member that comes into contact with the bars below the conveyance path of the bar conveyor. As the bars move, the bars rotate by coming into contact with the plate member.

Conveyor is Bar Conveyor (Third Embodiment)

Figure 10:
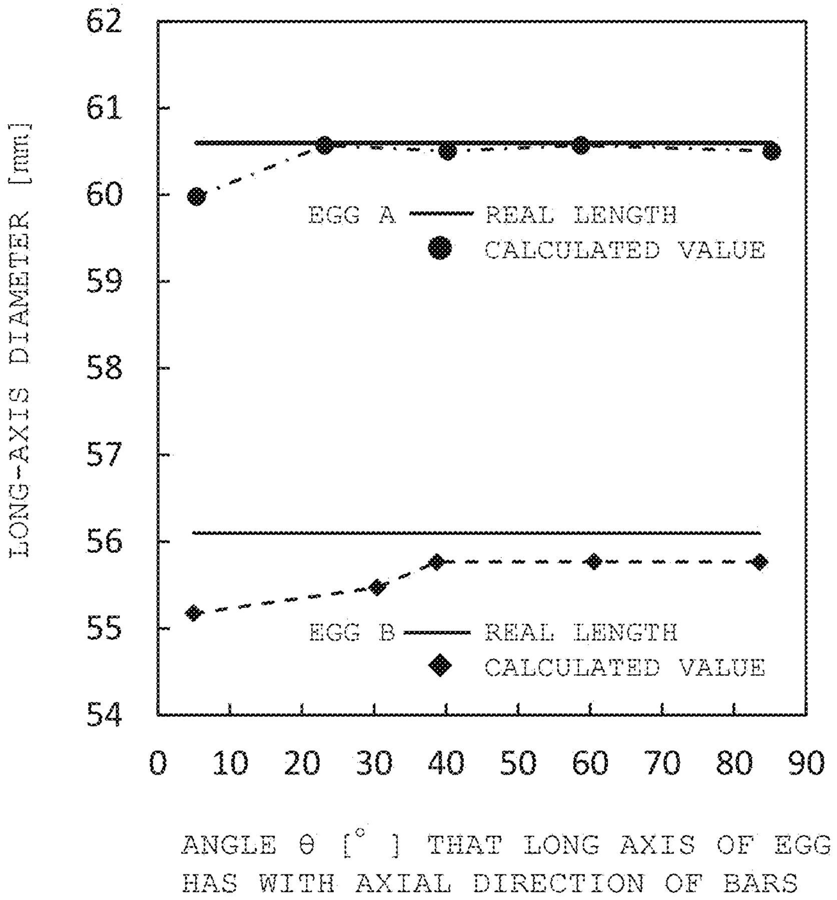
FIG. 10 is a graph indicating that a difference in an angle that a long axis of the egg has with the axial direction of the bars affects size measurement.

The following description relates to a case where, when eggs in various orientations are conveyed by a bar conveyor without aligning the orientation of the eggs, the real size of each egg is determined by photographing the egg from directly above by using a camera. As mentioned above, an egg conveyed by a bar conveyor is fitted between the bars, and the depth varies depending on the size of the egg. In addition, if an angle between the long axis of the egg and the axial direction of the bars varies, the fit depth between the bars is affected, as shown in FIG. 10, thus affecting the length in the captured image. FIG. 10 is a graph in which values (calculated values) converted from the long-axis diameters in captured images are illustrated together with the real lengths of the long-axis diameters. The captured images are obtained by retaining eggs A and B of different sizes between the bars while the angle that the long axis of each egg has with the axial direction of the bars is varied, and then photographing the eggs A and B. Each calculated value is a value calculated by using the second relational expression when each egg is placed on the reference surface without taking into account the fit depth between the bars.

It is apparent from FIG. 10 that, when the fit depth between the bars is not taken into account, the length calculated from the size in the captured image is smaller than the real size. This is because the distance from the camera is larger by an amount equivalent to the fit depth. In addition to being larger with decreasing size of the egg, the degree by which the calculated value is smaller than the real length increases with decreasing angle that the long axis of the egg has with the axial direction of the bars.

Thus, multiple eggs of known sizes and various sizes are preliminarily retained between the bars such that an angle θ of the long axis L relative to the axial direction of the bars varies within a range between 0° and 90°, and are photographed from directly above under the same photographing conditions. The length in each captured image is measured, and a table in which the length in the captured image and the real length correspond with each other for every angle θ is created, as shown in FIG. 11A. This will be defined as a first table. In the shown example of the table, the long-axis diameter with regard to the size of each egg is known and corresponds with the long-axis diameter in the image. However, the size to be focused on is not limited to the long-axis diameter and may alternatively be the maximum short-axis radius or the maximum short-axis diameter (i.e., maximum diameter in a cross-sectional circle orthogonal to the long axis).

Based on the first table, a table in which the ratio between the real length and the length in the captured image corresponds with the real length for every angle θ is created, as shown in FIG. 11B. This will be defined as a second table. FIG. 11B indicates an example where the ratio is the length in the captured image relative to the real length.

An egg of an unknown size conveyed by a bar conveyor with the same conditions, such as the pitch between the bars, as when these tables are created is photographed from directly above under the same photographing conditions. From the obtained captured image, an egg image is extracted in accordance with an image analysis, and an image of the bars is also extracted. Considering that eggs of different sizes have similar shapes, the size of each egg image and the angle θ of the long axis L relative to the axial direction of the bars in each captured image are measured, so that the real size of each egg can be determined by using the first table and the second table. For example, when the long-axis diameter LD' is 57.4 mm and θ is 30° in the captured image, it is clear that the actual long-axis diameter LD of the egg is 58.0 mm based on the first table. When the actual long-axis diameter LD is 58.0 mm and θ is 30°, it is clear that the ratio of the length in the captured image to the real length is 0.99 based on the second table. Therefore, by dividing another length, such as the short-axis radius SR'n in the captured image by this ratio, the corresponding real length can be determined, so that the volume of the egg can be calculated, whereby the mass thereof can be estimated.

Although the present invention has been described above with reference to preferred embodiments, the present invention is not limited to the above embodiments, and various improvements and design modifications are possible so long as they do not depart from the scope of the invention.

For example, although each of the above embodiments is described while comparing the real length and the length in the captured image by using the same units (millimeters), pixels may be used as units with regard to the length in the image. Even when pixels are used as units, the procedure of the above-described process and the method of how each relational expression is determined are the same.

What is claimed is:

1. An egg measuring method of using a camera to photograph, from directly above, an egg of an unknown size conveyed by a conveyor, measuring a size of an egg image extracted from a captured image, and determining a real size of the egg, the egg measuring method comprising:

defining a rotation center axis as a long axis when a three-dimensional shape of the egg is regarded as a rotating body, and defining a radius with a maximum length as a maximum short-axis radius among radii of an infinite number of cross-sectional circles orthogonal to the long axis;

setting a reference surface where a distance from the camera is a predetermined value;

preliminarily determining a first relational expression and preliminarily determining a second relational expression from the first relational expression, the first relational expression being determined by placing multiple eggs of different sizes with known maximum short-axis radii or spheres with known radii on the reference surface and photographing the eggs or the spheres, the first relational expression being a relationship between a real length of a maximum short-axis radius and a maximum short-axis radius in the captured image, the second relational expression indicating a change in a ratio between a length in the captured image and the real length in accordance with a height from the reference surface; and converting the size of the egg image into the real size based on the first relational expression and the second relational expression.

2. The egg measuring method according to claim 1, wherein the conveyor comprises a conveyor in which the reference surface serves as a conveyance surface, and wherein, when a contour of the egg image is a contour at a height h from the reference surface with respect to the egg placed on the reference surface, a relationship in which the height h is the real length of the maximum short-axis radius is used to convert the size in the captured image into the real length by using the real length of the maximum short-axis radius determined from the first relational expression as the height from the reference surface in the second relational expression.

3. The egg measuring method according to claim 1, wherein the conveyor comprises a bar conveyor that conveys the egg while retaining the egg between bars, wherein, when a contour of the egg image is a contour at a height h from the reference surface with respect to the egg retained between the bars, a distance between the bars is defined as 2d, the real length of the maximum short-axis radius is defined as r, and the reference surface is aligned with an imaginary plane connecting upper end lines of the bars to each other, a third relational expression is determined from the second relational expression by using a relationship in which $h=(r^2-d^2)^{1/2}$, the third relational expression indicating a relationship between the size of the egg image and the real size, and wherein the real size of the egg whose long axis is aligned with an axial direction of the bars is determined from the third relational expression.

4. An egg measuring method of using a camera to photograph, from directly above, an egg of an unknown size conveyed by a conveyor, measuring a size of an egg image extracted from a captured image, and determining a real size of the egg, wherein the conveyor comprises a bar conveyor that conveys the egg while retaining the egg between bars, wherein the egg measuring method comprises:

defining a rotation center axis as a long axis when a three-dimensional shape of the egg is regarded as a rotating body;

preliminarily creating a table by retaining multiple eggs or egg-shaped alternatives with known sizes and different sizes between bars and photographing the eggs or the egg-shaped alternatives while long axes thereof have different angles with an axial direction of the bars, the table having sizes in captured images being associated with real sizes and the angles; and determining the real size of the egg from the table by measuring the size of the egg image and the angle that the long axis has with the axial direction of the bars in the captured image.

* * * * *